No. 647,650. Patented Apr. 17, 1900.
C. DANIELS.
VEHICLE BRAKE.
(Application filed Nov. 18, 1899.)
(No Model.)
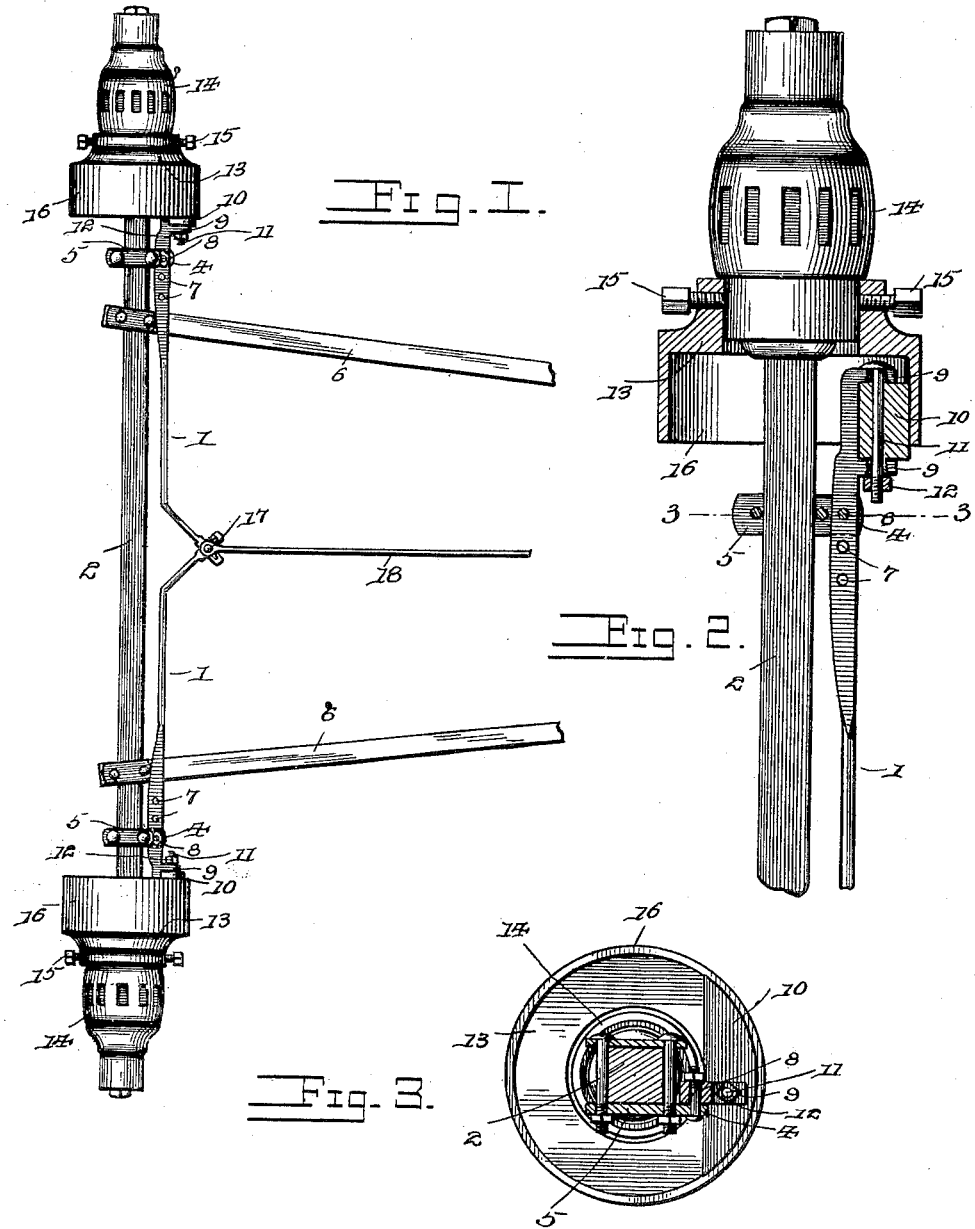
Witnesses
F. E. Alden.
J. J. Riley
Charles Daniels, Inventor,
By his Attorneys,
C. A. Snow & Co.

UNITED STATES PATENT OFFICE.

CHARLES DANIELS, OF CATSKILL, NEW YORK.

VEHICLE-BRAKE.

SPECIFICATION forming part of Letters Patent No. 647,650, dated April 17, 1900.

Application filed November 18, 1899. Serial No. 737,479. (No model.)

*To all whom it may concern:*

Be it known that I, CHARLES DANIELS, a citizen of the United States, residing at Catskill, in the county of Greene and State of New York, have invented a new and useful Vehicle-Brake, of which the following is a specification.

The invention relates to improvements in vehicle-brakes.

The object of the present invention is to improve the construction of brake mechanism and to provide a simple, inexpensive, and efficient brake which, while being applicable to all kinds of vehicles, will be especially adapted for light wagons, carriages, and the like, and which will be capable of being compactly arranged on and readily applied to an ordinary running-gear.

The invention consists in the construction and novel combination and arrangement of parts hereinafter fully described, illustrated in the accompanying drawings, and pointed out in the claims hereto appended.

In the drawings, Figure 1 is a plan view of a portion of a running-gear provided with brake mechanism constructed in accordance with this invention. Fig. 2 is an enlarged horizontal sectional view of one side of the brake mechanism. Fig. 3 is a sectional view on line 3 3 of Fig. 2.

Like numerals of reference designate corresponding parts in all the figures of the drawings.

1 designates a pair of transverse brake-levers located adjacent to and preferably in advance of the rear axle 2 of a running-gear and fulcrumed near their outer ends on an extension 4 of a bottom clip-plate 5 of a pair of clips, which may be of any desired construction. The clips may consist of an ordinary axle-clip or they may be composed of upper and lower clip-plates and a pair of bolts located at opposite sides of the axle and passing through the perforations of such plates. The lower plates 5 extend in advance of the rear axle and are located at the outer side of reaches 6, and the transverse brake-levers, which are provided with series of perforations 7, are adjustably fulcrumed on the clip-plates 5 by means of bolts 8 or other suitable fastening devices, whereby the leverage may be varied to provide a brake of the desired power.

The brake-levers are provided at their outer ends with lugs or ears 9, arranged in pairs and extending outward from the levers and forming recesses for the reception of brake-shoes 10, which are secured between the lugs or ears by bolts 11 or other suitable fastening devices. The bolts 11, which are provided at their outer ends with heads, have nuts 12 at their inner ends; but the nuts can be omitted, if desired, as the heads of the bolts are arranged within collars 13, mounted on the inner end of the hubs 14. The fastening devices 11 extend longitudinally of the levers, and the collar 13, which is arranged on the inner end band of the hub, is secured to the same by clamping-screws 15, arranged in threaded perforations of the collar and engaging the hub, as clearly illustrated in Fig. 2 of the accompanying drawings. The collar is provided with an annular flange or band 16, extending inward toward the adjacent lever and receiving the same and the brake-shoe 10 carried thereby. The brake-shoe is adapted to engage the inner face of the annular flange, and the arrangement of the brake-lever is such that the necessary power for an efficient brake is afforded.

The inner ends of the brake-levers are arranged at an angle and converge forwardly and are pivoted by a fastening device 17 to the rear end of a central longitudinal connecting-rod 18, which is designed to extend forward to the front portion of the vehicle, and any suitable operating mechanism may be provided to actuate the levers and apply the brake. The converging portions 18 of the transverse brake-levers are slotted to receive the pivot 17; but any other suitable connection may be provided. When the connecting-rod is thrown rearward, the outer ends of the transverse brake-levers are carried forward and the brake-shoes, which are segmental to conform to the configuration of the flange of the collars, frictionally engage the same and form an efficient lock for checking a vehicle and for holding it stationary. When it is desired to change the leverage, the clips, which support the levers, may be readily moved longitudinally of the axle 2 to arrange the extensions of the bottom clip-plates at the desired perforations.

It will be seen that the brake mechanism is exceedingly simple and inexpensive in construction, that it possesses great strength and durability, and that it is compactly arranged on the running-gear and may be readily applied to the same. It will also be clear that it does not necessitate any alteration in the construction of the running-gear, as the brake-levers are clipped to the rear axle, and the collars may be constructed of any diameter to suit the hubs to which they are to be applied.

What is claimed is—

1. In a vehicle-brake, the combination with an axle, and wheels, of collars mounted on the wheels at the hubs thereof, and provided with annular flanges, a pair of levers disposed longitudinally of the axle and fulcrumed between their ends thereon, and capable of longitudinal adjustment to vary the leverage, the outer ends of the levers being arranged within the said flanges, brake-shoes secured to the outer ends of the levers and engaging the said flanges, and a rod connected with the inner ends of the levers, substantially as described.

2. In a vehicle-brake, the combination of a collar provided with an annular flange and designed to be mounted on the inner end of the hub of a wheel, a brake-lever arranged longitudinally of the axle and extending into the collar and provided at its outer end with a pair of ears or lugs, a brake block or shoe mounted between the ears or lugs and engaging the flange, a clip supporting the lever, and means for operating the latter, substantially as described.

3. In a vehicle-brake, the combination with a pair of hubs carrying annular flanges, of the transverse brake-levers extending longitudinally of the axle, fulcrumed between their ends and provided at their inner ends with converging portions, a connecting-rod pivotally attached to the adjacent ends of the said converging portions, and brake-shoes mounted on the outer ends of the levers and arranged within the said flanges, substantially as described.

4. In a vehicle-brake, the combination with an axle, and a pair of hubs carrying annular flanges, of clips mounted on the axle and provided with extensions, transverse levers adjustably fulcrumed on the extensions and provided at their inner ends with converging portions, said levers being provided at their outer ends with perforated ears arranged in pairs, brake blocks or shoes arranged between the perforated ears, headed fastening devices passing through the ears and having their heads arranged within the said flanges, whereby they are prevented from becoming displaced, and a connecting-rod extending from the converging portions of the levers, substantially as described.

In testimony that I claim the foregoing as my own I have hereto affixed my signature in the presence of two witnesses.

CHARLES DANIELS.

Witnesses:
JUDSON A. BETTS,
JOHN H. LYONS.